(12) United States Patent
Hornick

(10) Patent No.: US 11,332,314 B2
(45) Date of Patent: May 17, 2022

(54) CONVEYOR BELT ASSEMBLY

(71) Applicant: BOBST MEX SA, Mex (CH)

(72) Inventor: Paul Hornick, Vufflens-le-Chateau (CH)

(73) Assignee: Bobst Mex SA, Mex (CH)

( * ) Notice: Subject to any disclaimer, the term of this patent is extended or adjusted under 35 U.S.C. 154(b) by 0 days.

(21) Appl. No.: 16/962,156

(22) PCT Filed: Jan. 9, 2019

(86) PCT No.: PCT/EP2019/025008
§ 371 (c)(1),
(2) Date: Jul. 14, 2020

(87) PCT Pub. No.: WO2019/137829
PCT Pub. Date: Jul. 18, 2019

(65) Prior Publication Data
US 2020/0407167 A1  Dec. 31, 2020

(30) Foreign Application Priority Data
Jan. 15, 2018 (EP) .................................... 18020022

(51) Int. Cl.
*B65G 17/06* (2006.01)
*B65G 15/12* (2006.01)
(Continued)

(52) U.S. Cl.
CPC .......... *B65G 17/065* (2013.01); *B65G 15/12* (2013.01); *B65G 15/62* (2013.01); *B65G 17/063* (2013.01);
(Continued)

(58) Field of Classification Search
CPC .................. B65G 17/065; B65G 15/12; B65G 21/2063; B65G 2249/04; B65G 2812/02425;
(Continued)

(56) References Cited

U.S. PATENT DOCUMENTS

| 1,030,479 | A | * | 6/1912 | Ofstad | B65G 47/66 |
| | | | | | 209/701 |
| 1,779,381 | A | * | 10/1930 | Johnson | B65G 17/063 |
| | | | | | 198/409 |
| 2,851,146 | A | * | 9/1958 | Sherrill | B65G 17/12 |
| | | | | | 198/358 |
| 3,147,848 | A | | 9/1964 | Churchill | |

(Continued)

FOREIGN PATENT DOCUMENTS

| CN | 102390679 A | 3/2012 |
| CN | 203245128 U | 10/2013 |

(Continued)

OTHER PUBLICATIONS

International Search Report issued in International Patent Application No. PCT/EP2019/025008, dated Apr. 17, 2019 (3 pages, in English).

*Primary Examiner* — Mark A Deuble
(74) *Attorney, Agent, or Firm* — Bookoff McAndrews, PLLC

(57) ABSTRACT

A conveyor belt assembly (10) for transporting single sheets or stacks of a packaging material is described. It comprises at least one conveyor belt (12a) being arranged over at least two pulleys (20a-20d), wherein at least one of the pulleys (20a-20d) is adapted to drive the conveyor belt (12a) in a conveying direction (15). Furthermore, the conveyor belt assembly (10) comprises a conveying section (22) adapted for transporting the sheets or stacks and a return section (24) adapted to return the conveyor belt (12a) from an end (22b)

(Continued)

Figure 1:
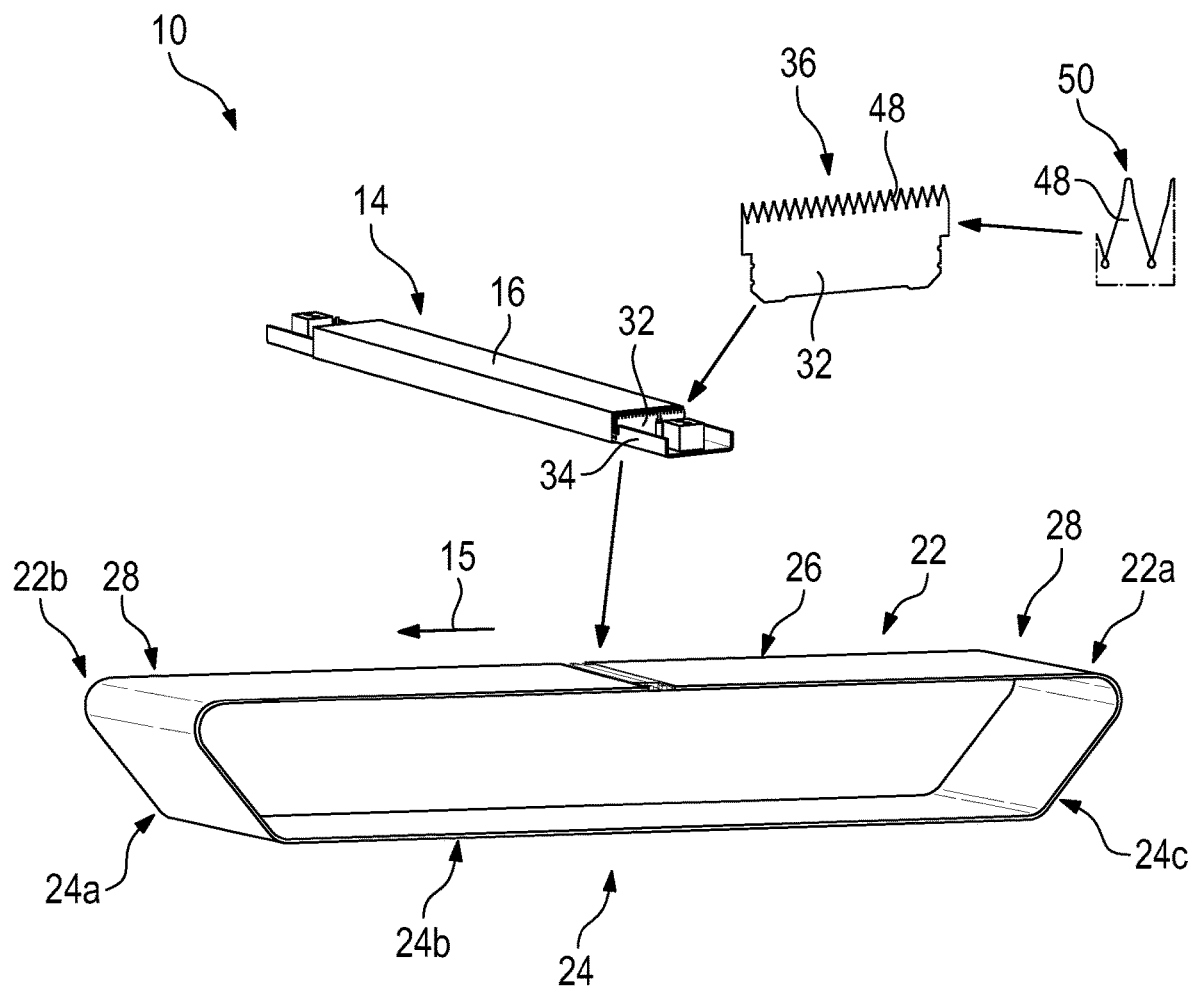

of the conveying section (22) to a beginning (22*a*) of the conveying section (22). The conveying section (22) is equipped with a middle section (26), in which the conveyor belt (12*a*) is arranged in a substantially flat manner, and at least one transition section (28) arranged between the middle section (26) and the respective pulley (20*a*-20*d*), with the conveyor belt (12*a*) being arranged in the transition section (28) in a retracted position with respect to a plane (26*a*) defined by the middle section (26).

17 Claims, 11 Drawing Sheets

(51) Int. Cl.
  *B65G 21/20* (2006.01)
  *B65H 5/02* (2006.01)
  *B65G 21/22* (2006.01)
  *B65G 15/62* (2006.01)
(52) U.S. Cl.
  CPC ......... *B65G 21/2063* (2013.01); *B65G 21/22* (2013.01); *B65H 5/021* (2013.01); *B65G 2249/04* (2013.01); *B65G 2812/02425* (2013.01); *B65H 2404/264* (2013.01)
(58) Field of Classification Search
  CPC ...... B65G 15/52; B65G 17/002; B65G 21/22; B65G 17/063; B65G 15/62; B65H 5/021; B65H 2404/264; B65H 2404/232; B23K 26/38; B23K 26/0838; B23K 37/0408
  See application file for complete search history.

(56) References Cited

U.S. PATENT DOCUMENTS

| | | | |
|---|---|---|---|
| 4,759,433 A * | 7/1988 | Kraft | B65B 35/50 198/418.7 |
| 5,306,212 A * | 4/1994 | Eberle | B65G 21/22 474/140 |
| 10,272,523 B2 | 4/2019 | Staubli | |
| 2005/0116396 A1 | 6/2005 | LeMasson | |
| 2006/0096243 A1* | 5/2006 | Weaver | B65G 17/065 53/249 |
| 2011/0132723 A1* | 6/2011 | Janning | B65G 19/245 198/479.1 |
| 2015/0246557 A1* | 9/2015 | Watanabe | B41J 11/0085 347/104 |
| 2015/0314976 A1* | 11/2015 | Hozumi | B65G 15/64 198/806 |
| 2016/0184929 A1 | 6/2016 | Staubli et al. | |
| 2017/0183163 A1* | 6/2017 | Von Birgelen | B65G 21/22 |
| 2017/0339830 A1* | 11/2017 | Saraiva | A01D 61/008 |

FOREIGN PATENT DOCUMENTS

| | | |
|---|---|---|
| CN | 103754567 A | 4/2014 |
| CN | 205414712 U | 8/2016 |
| DE | 3542198 A1 | 6/1987 |
| DE | 10359014 A1 | 8/2005 |
| DE | 102010030417 B3 | 12/2011 |
| DE | 102011106469 A1 | 12/2012 |
| JP | S5111583 U | 1/1976 |
| KR | 20150137354 A | 12/2015 |
| WO | 2009024163 A1 | 2/2009 |

* cited by examiner

PRIOR ART

CONVEYOR BELT ASSEMBLY

CROSS-REFERENCE TO RELATED APPLICATION(S)

This application is a National Stage under 35 U.S.C. § 371 of International Application No. PCT/EP2019/025008, filed on Jan. 9, 2019, which claims priority to European Patent Application No. 18020022.2, filed on Jan. 15, 2018, the contents of all of which are incorporated by reference in their entirety.

The invention relates to a conveyor belt assembly for transporting single sheets or stacks of a packaging material.

In this context, a stack of a packaging material is to be understood as a plurality of sheets made of the packaging material and being arranged one above the other in a well-defined manner.

Such conveyor belt assemblies are known in the art, for example in the packaging industry.

More specifically, such conveyor belt assemblies are used in packaging material cutting or creasing machines, in which the cutting or creasing is performed on-the-fly, i.e. the packaging material is cut or creased while being transported through the machine.

Usually the packaging material to be cut is held on the conveyor belt assembly by vacuum. In known configurations, a vacuum source, e. g. vacuum pump, is arranged under a conveying section of the conveyor belt assembly, cooperating with vacuum exhausters holding the packaging material tightly to the conveying section.

For economical reasons cutting or creasing of packaging material has to be done as fast as possible. As a result thereof, the conveying of the packaging material also has to be done at high speed. At the same time, packaging materials can be delicate materials and care has to be taken not to damage the packaging material in any sense, e.g. by scratches, bends or kinks. Generally speaking, the higher the conveying speed, the higher the risk of damaging the packaging material.

Consequently, it is an object of the present invention to define a conveyor belt assembly of the type mentioned above, which solves the conflict mentioned above. Especially, the conveyor belt assembly of the present invention shall allow high speed conveying of packaging material without risking to damage the packaging material.

This problem is solved by a conveyor belt assembly of the type mentioned above, comprising at least one conveyor belt being arranged over at least two pulleys, wherein at least one of the pulleys is adapted to drive the conveyor belt in a conveying direction, the conveyor belt assembly comprising a conveying section adapted for transporting the sheets or stacks and a return section adapted to return the conveyor belt from an end of the conveying section to a beginning of the conveying section, wherein the conveying section comprises a middle section, in which the conveyor belt is arranged in a substantially flat manner, and at least one transition section arranged between the middle section and the respective pulley, with the conveyor belt being arranged in the transition section in a retracted position with respect to a plane defined by the middle section. When imagining the plane defined by the middle section as being infinite, the transition section is arranged within a distance of this plane. In the assembled state of the conveyor belt assembly the transition section is always located below this plane. The transition section preferably is arranged in an area where the return section neighbors the conveying section. In usual arrangements, in this area also one of the pulleys is positioned and the conveyor belt covers the pulley by a certain angle. On the conveyor belt generally rigid support devices are arranged, which are in contact with the packaging material. When these support devices are in the area of one of the pulleys, it is possible that one or more edges thereof protrude from a general conveying surface. These edges present a risk of damaging the packaging material, which increases with higher conveying speed. The retracted position of the transition section produces a gap between the general conveying surface, i.e. the surface where the packaging material is located, and the support devices being mounted on the conveyor belt. Therefore, the risk of damaging the packaging material is effectively eliminated.

The transition section can be formed by a radius of 3 m to 6 m, especially of about 4 m. Then the conveyor belt moves along this radius, when in the transition section. Thereby a gap separating the support devices of the conveyor belt assembly from the delicate packaging material is created.

Alternatively, the transition section can be at an angle with respect to the middle section. Also in this configuration, the risk of damaging the packaging material is eliminated.

The packaging material can be paper, cardboard or a plastic material. Also sheets made of a plurality of materials are possible. Such packaging material sheets for example comprise a layer of paper or cardboard covered with a layer of plastic, which also can be called a coating.

Preferably, the transition section is arranged at a beginning of the conveying section or at an end of the conveying section when seen in the conveying direction or the conveying section comprises two transition sections, wherein one is arranged at the beginning of the conveying section and one is arranged at the end of the conveying section. Consequently, the transition section is arranged in the area of the pulleys, where the conveyor belt changes its direction of movement. As explained above, also support devices being mounted on the conveyor belt change their direction of movement in this location. In these areas, the risk of damaging the packaging material is high in known conveyor belt assemblies. The transition section according to the invention eliminates or at least reduces the risk of damaging the packaging material. As a consequence thereof, higher conveying speeds are possible.

The transition section has a length which is more than the radius of the pulleys, thereby merging with the middle section at a point which is in a distance from the axis of rotation of the pulley by more than the radius of the pulley and preferably by more than the diameter of the pulley. The significant length of the transition section ensures the smooth approach of the conveyor belt towards the level of the middle section and the smooth depart from this level, respectively, In an embodiment the pulleys have a diameter of 100 mm to 300 mm, preferably approximately 150 mm. It has been found that these diameters combine high potential conveying speed, low risk of damaging the packaging material and low required space. Of course the invention is not limited to these diameters and deviations therefrom are perfectly possible.

It is preferred that the conveyor belt assembly comprises four pulleys, wherein the respective axis of rotation of the pulleys are substantially parallel and the pulleys are arranged in a substantially trapezoidal manner when seen in the direction of the axis of rotation. In this configuration a vacuum system or other technical devices can be arranged inside the space being defined by the four axis of rotation and the respective lateral surfaces of the conveyor belt. Such a conveyor belt assembly is compact with respect to space requirements. Therefore, it is especially suitable for being integrated in a packaging material cutting or creasing machine.

The conveying section can comprise a guide rail being adapted to define the form of the conveying section, preferably wherein the guide rail is made from a low friction material. Such a guide rail is used to precisely define the location of the conveyor belt or a support device mounted thereon, even at high conveying speeds. Consequently, the task of positioning the conveying surface including the transition region is performed by the guide rail. The task of moving the conveyor belt is performed by a different device. As a result thereof, the form of the conveying section, especially the transition section is defined in an easy and reliable manner.

Preferably one or more support devices are mounted on the conveyor belt, wherein each of the support devices provides a support surface configured to support the single sheets or stacks of packaging material. Consequently, a conveying surface is formed by a plurality of adjacent support devices. They can be made from metal material.

The support devices can be in sliding connection with the guide rail when located in the conveying section. This means that the support devices closely follow the contour defined by the guide rail. This means that the support devices are arranged on a flat plane in the middle section and for example on a radius of 3 m to 6 m in the transition section.

In a preferred variant two or more guide rails, especially three guide rails, are provided, each being in sliding connection with the support devices. With more than one guide rail the contour to be followed by the conveyor belt and/or the support devices mounted thereon is defined in a more reliable manner. Especially undesired tilting, twisting and turning of the conveyor belt and the support devices connected therewith is prevented. As a consequence the conveyor belt and the support devices precisely follow the contour of the guide rails. Therefore, damaging the packaging material is prevented.

The conveyor belt assembly can comprise two conveyor belts, which are arranged in a substantially parallel manner. Even though theoretically one conveyor belt is enough, by using two conveyor belts, a more uniform movement of the support devices and thus the packaging material can be achieved. Furthermore, such a conveyor belt assembly can bear higher loads and higher conveying speeds.

In an embodiment a first end of each of the one or more support devices is attached to a first conveyor belt and a second end of each of the one or more support devices is attached to a second conveyor belt. Preferably, the support devices are screwed to the conveyor belts. This arrangement allows for a uniform conveying movement.

The support devices can extend substantially perpendicular to the conveying direction.

Advantageously, the support devices are substantially rigid. Preferably, the support devices are made from metal or plastics.

In a variant the transition section is 50 mm to 600 mm long, when measured in the conveying direction. This size of the transition zone guarantees an effective damage prevention concerning the packaging material to be conveyed.

Figure 3:
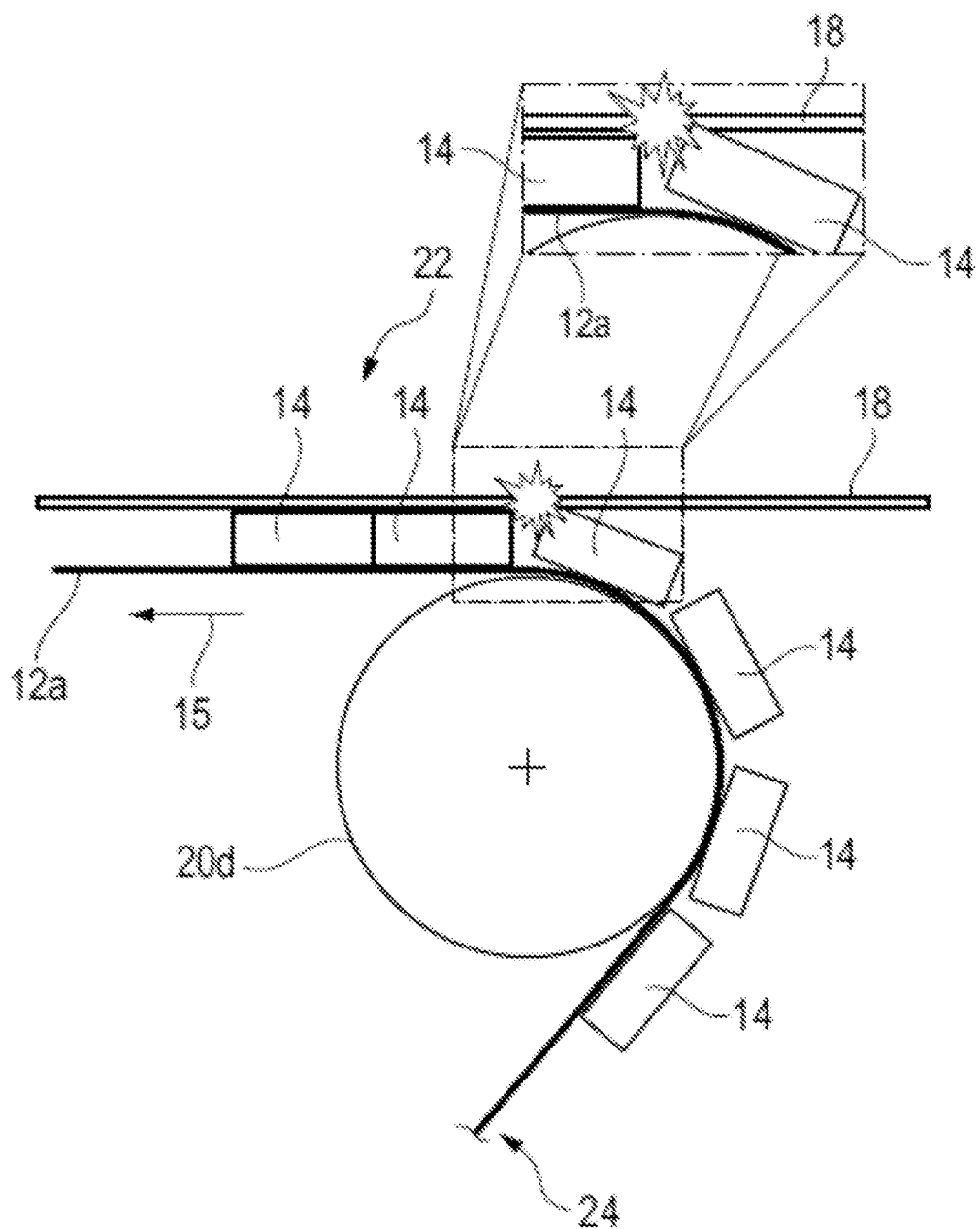
Figure 4:
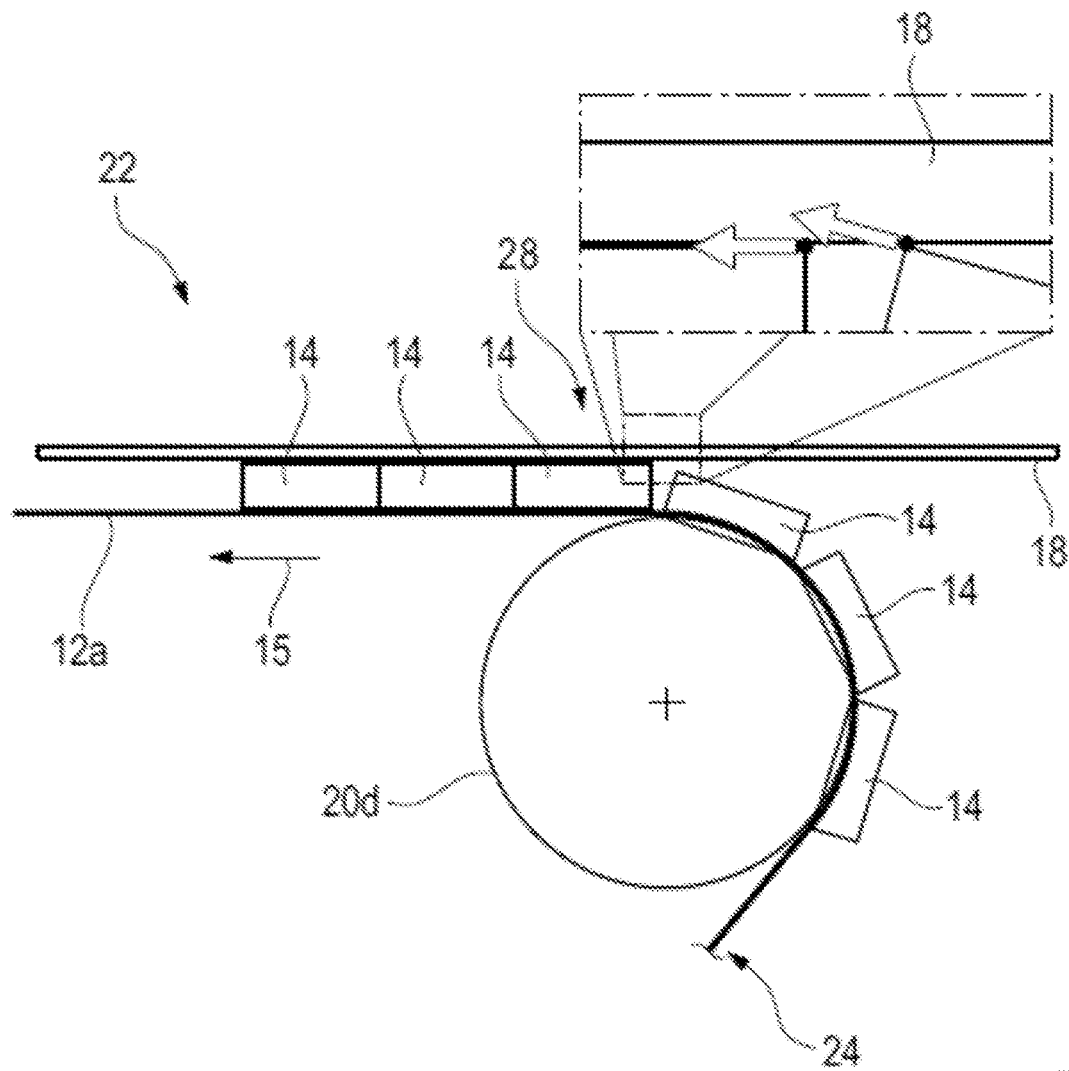
Figure 5:
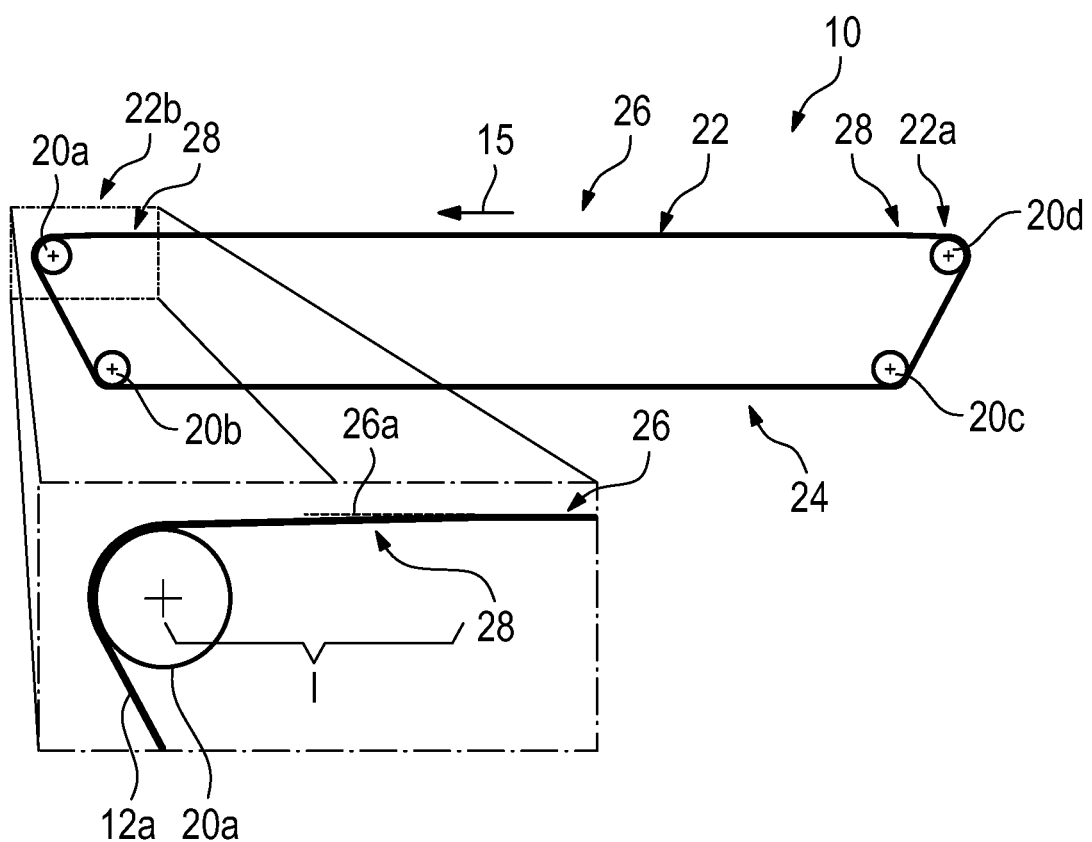
Figure 6:
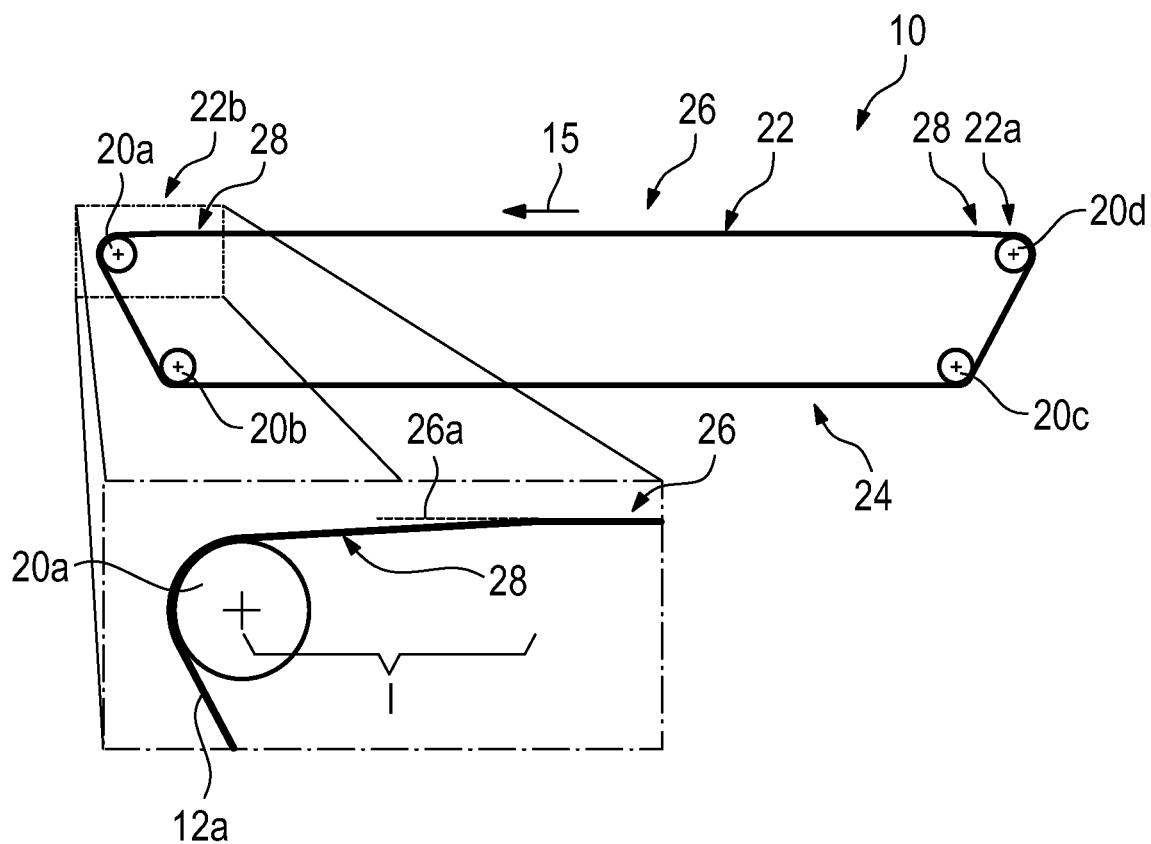
Figure 7:
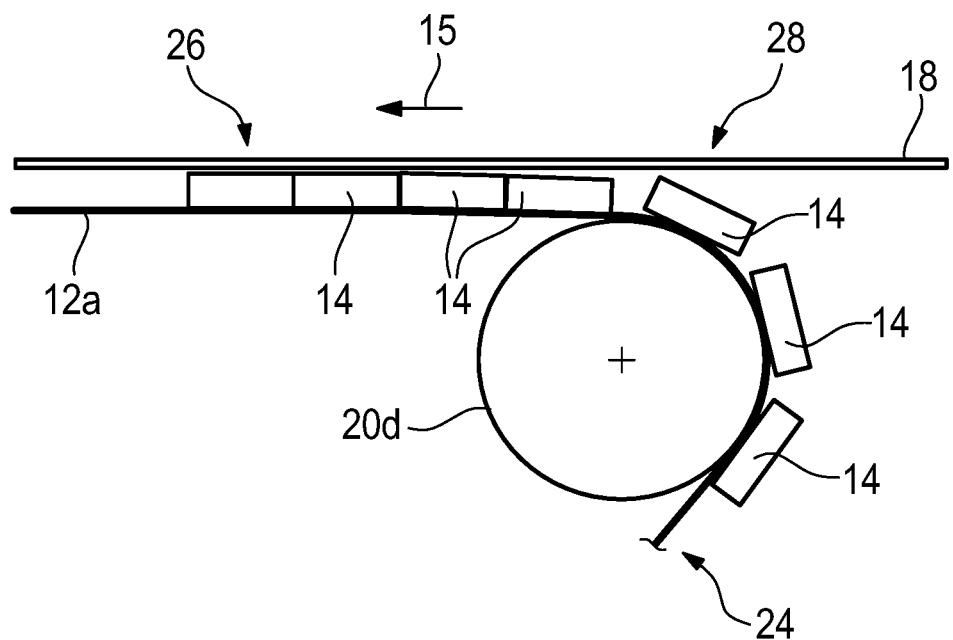
Figure 8:
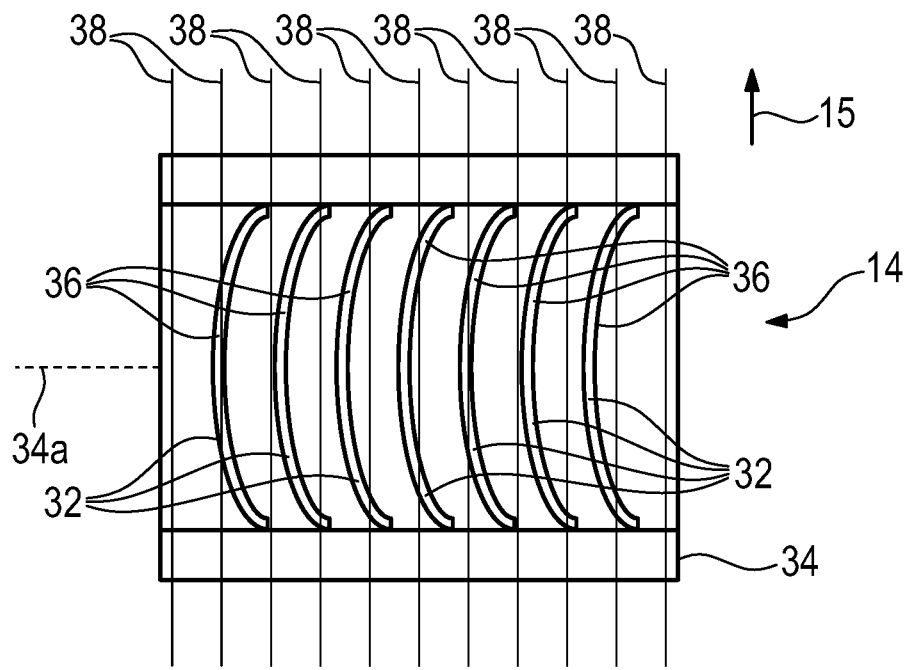
Figure 9:
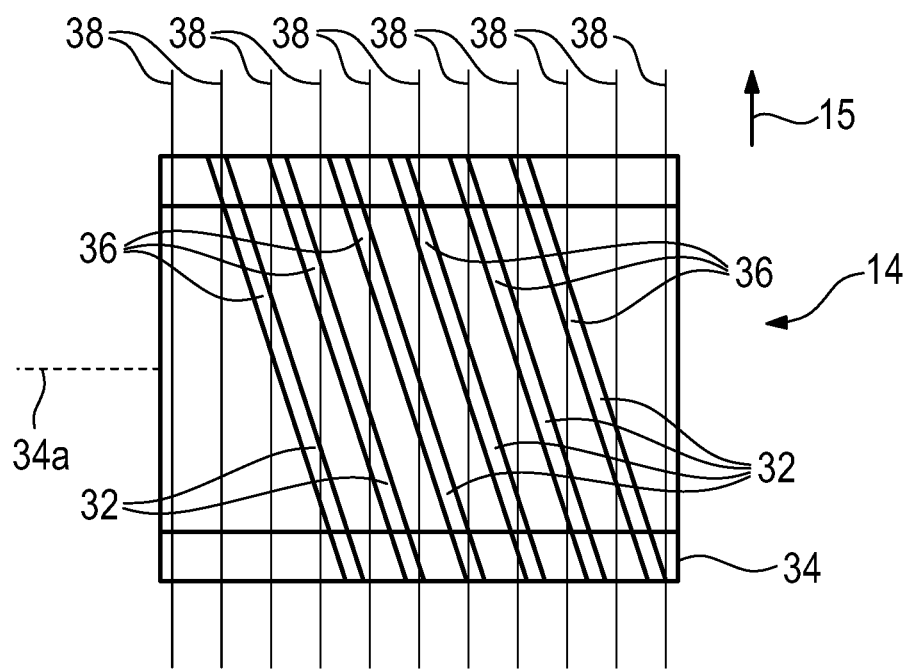
Figure 10:
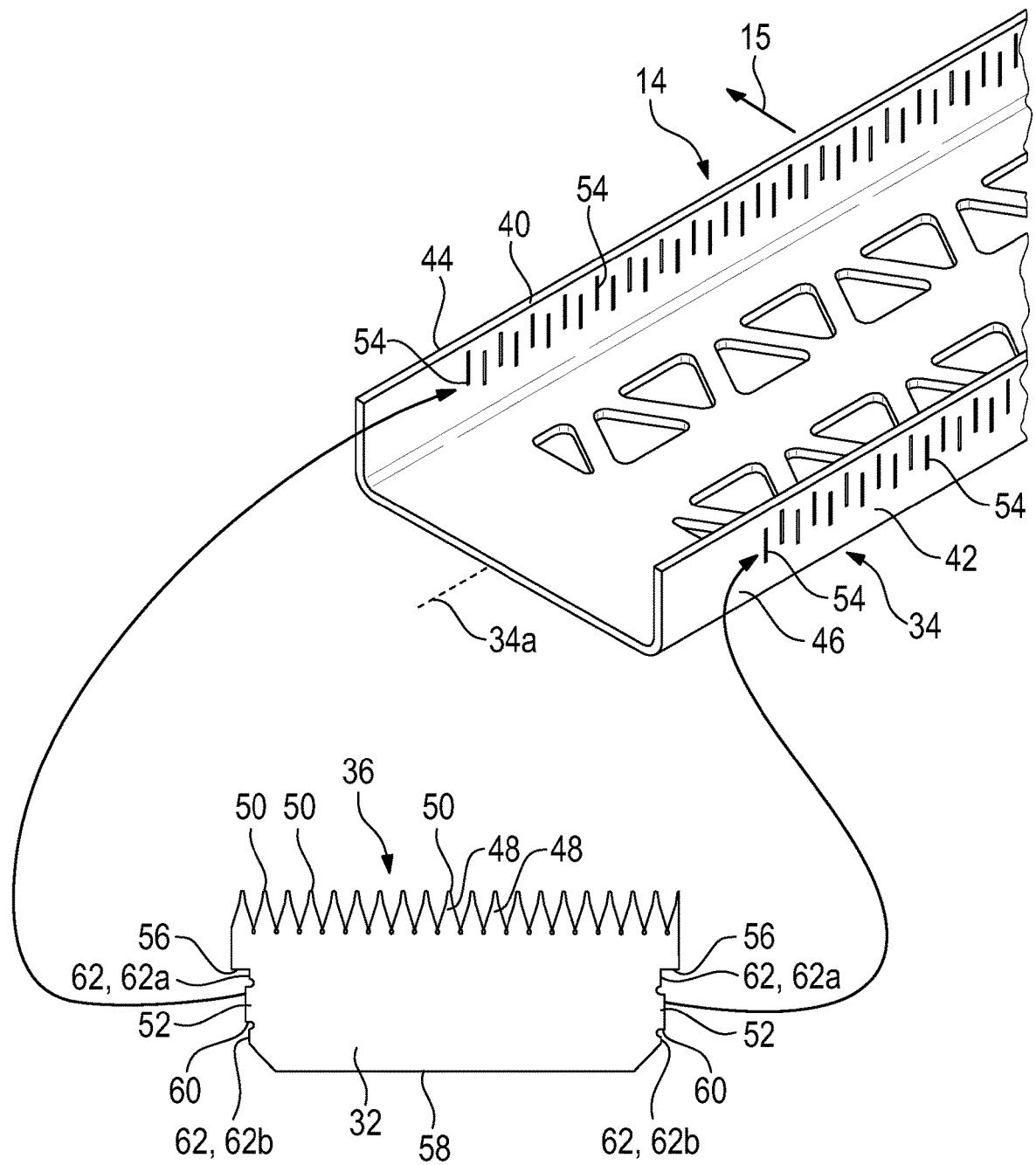
Figure 11:
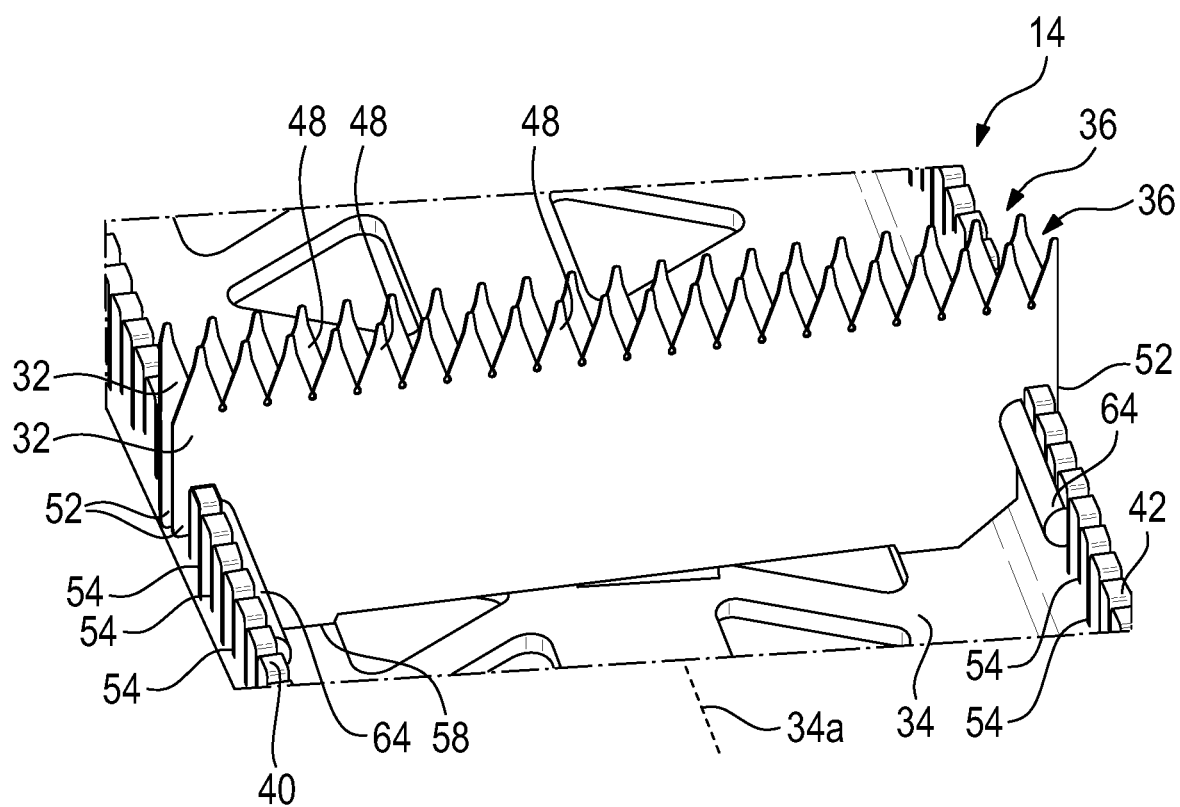
Figure 12:
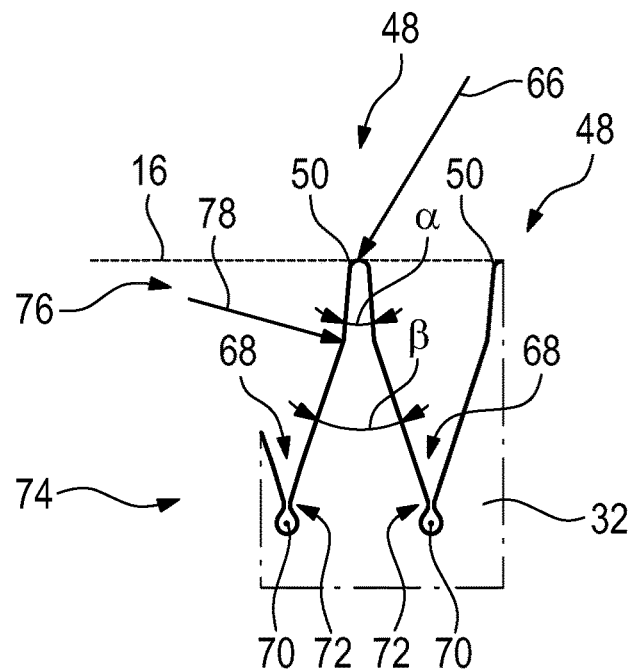
Figure 13:
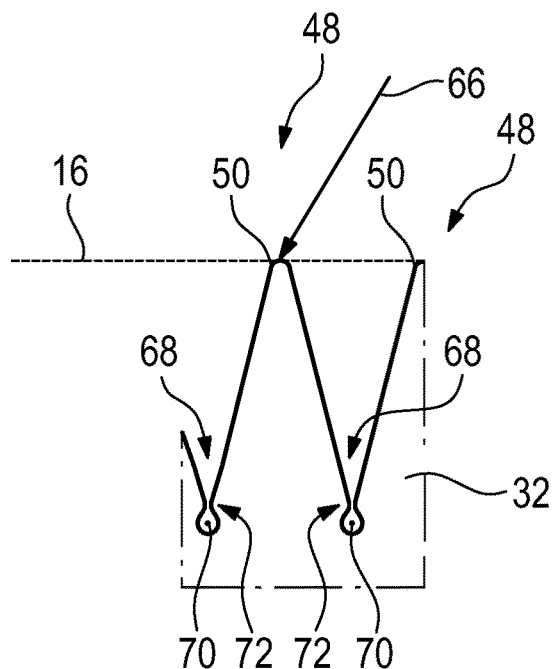

The invention will now be explained with reference to several embodiments which are shown in the attached drawings. In the drawings, FIG. 1 shows a schematic overview of a conveyor belt assembly according to the invention in an exploded view, FIG. 2 shows a detail of the conveyor belt assembly according to FIG. 1, FIG. 3 shows the functional principle of a known conveyor belt assembly, FIG. 4 shows an alternative functional principle of another known conveyor belt assembly, FIG. 5 shows the geometry of a transition section of a conveyor belt assembly according to the invention, FIG. 6 shows an alternative geometry of a transition section of a conveyor belt assembly according to the invention, FIG. 7 shows a detailed overview of a conveyor belt assembly according to the invention, FIG. 8 shows an embodiment of a support device according to the invention, FIG. 9 shows an alternative embodiment of a support device according to the invention, FIG. 10 shows an exploded view of a support device according to the invention, wherein only one exemplary slat is shown, FIG. 11 shows an alternative embodiment of a support device according to the invention, wherein two exemplary slats are shown, FIG. 12 shows a detailed view of a tooth of a support device according to the invention, and FIG. 13 shows a detailed view of an alternative tooth of a support device according to the invention.

FIG. 1 shows a conveyor belt assembly 10 for transporting single sheets or stacks of packaging material.

Figure 2:
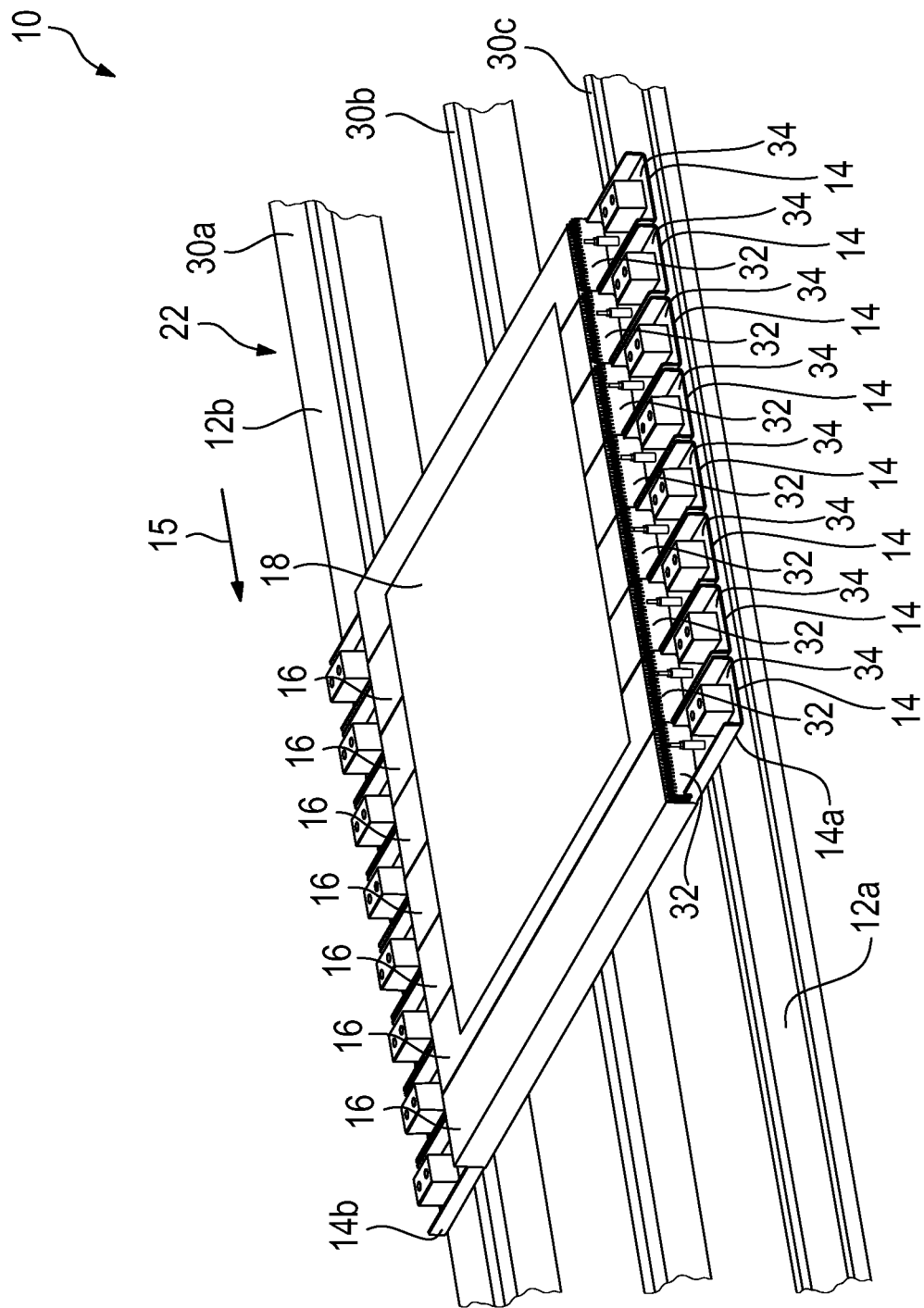

It comprises two conveyor belts 12a, 12b which are arranged in a substantially parallel manner (cf. FIG. 2).

On the conveyor belts 12a, 12b a plurality of support devices 14 are mounted.

More precisely, a first end 14a of each of the support devices 14 is attached to a first conveyor belt 12a and a second end 14b of each of the support devices 14 is attached to a second conveyor belt 12b.

The support devices 14 extend substantially perpendicular to the conveyor belts 12a, 12b and a conveying direction 15.

The support devices 14 are substantially rigid and each of them provides a support surface 16 configured to support the single sheets or stacks of packaging material.

In the figures a single sheet 18 of packaging material can be seen. It is also representative of stacks of packaging material.

In order to convey the sheets or stacks of packaging material, the conveyor belts 12a, 12b are arranged over pulleys 20a, 20b, 20c, 20d (cf. FIGS. 4 to 7).

For each conveyor belt at least one of the pulleys 20a to 20d is adapted to drive the corresponding conveyor belt 12a, 12b in the conveying direction 15.

The pulleys 20a to 20d have diameters of 100 mm to 300 mm.

In the example shown, the conveyor belt assembly 10 comprises four pulleys 20a to 20d, wherein the respective axis of rotation of the pulleys 20a to 20d are substantially parallel.

As can especially be seen from FIGS. 5 and 6, the pulleys 20a to 20d are arranged in a substantially trapezoidal manner, when seen in the direction of the axis of rotation.

The area of movement of the conveyor belts 12a, 12b and the support devices 14 mounted thereon can be subdivided into different sections.

A conveying section 22 is adapted for transporting the sheets 18 or stacks of packaging material.

A return section 24 is adapted to return the conveyor belts 12a, 12b from an end 22b of the conveying section 22 to a beginning 22a of the conveying section 22.

In the example the return section 24 comprises return section elements 24a, 24b and 24c, wherein return section element 24c is arranged adjacent to the beginning 22a of the conveying section 22 and return section element 24a is neighboring the end 22b of the conveying section 22.

The conveying section 22 can be subdivided into a middle section 26 in which the conveyor belts 12a, 12b are arranged in a substantially flat manner and a transition section 28.

In the transition section 28 the conveyor belts 12a, 12b are arranged in a retracted position with respect to a plane 26a defined by the middle section 26.

In the example the conveyor belt assembly 10 comprises two transition sections 28, wherein one is arranged at the beginning 22a of the conveying section 22 and one is arranged at the end 22b of the conveying section 22.

It is noted that in FIG. 1 only an enveloping geometry is shown, in which the conveyor belts 12a, 12b and the support devices 14 are movable.

In the embodiment according to FIG. 5 the transition section 28 has a curved shape with a radius of approximately 4 m. This means that between the middle section 26 and the area, where the conveyor belts 12a, 12b are in contact with the pulley 20a, the conveyor belts 12a, 12b and the support devices 14 mounted thereon move on a portion of a circle line.

In the alternative embodiment shown in FIG. 6 the transition section 28 is plane, but inclined with respect to the middle section 26.

Also a combination of the embodiments shown in FIGS. 5 and 6 is possible, i. e. the transition section 28 comprises a curved section with a radius and a plane, but inclined section.

The transition section 28 has a length l, which is between 50 mm and 600 mm when measured in the conveying direction 15.

As can be seen in FIGS. 5 and 6, length l of the transition section 28 is larger than the radius (and in these embodiments also than the diameter) of the pulleys 20. Accordingly, the transition section 28 merges into the middle section 26 at a point which is inwardly (meaning: arranged closer to the center of the belt assembly 10) of the innermost position of the circumference of the respective pulley 20. In other words: if one draws a vertical tangent to the inner side of the pulley (the side which is not covered by belt 12), this tangent runs through the transition section 28.

The significant length of the transition section 28 ensures that the conveyor belt is smoothly guided from the pulley to the level of the middle section 26, and is smoothly guided from the level of the middle section 26 towards the next pulley.

In a preferred embodiment, a curved section with a radius of about 4 m and a length of about 200 mm is interposed between two straight sections.

In order to move the conveyor belts 12a, 12b and especially the support devices 14 mounted thereon on the geometry described above, guide rails 30a, 30b, 30c are provided in the conveying section 22.

The guide rails 30a, 30b, 30c are made of a low friction material and the support devices 14 are in sliding connection with the guide rails 30a, 30b, 30c, when located in the conveying section 22.

The effect produced by the conveyor belt assembly 10 can best be understood from FIGS. 3, 4 and 7.

All three figures show conveyor belt 12a and a selection of support devices 14 mounted thereon, which are about to move from the return section 24 to the conveying section 22.

In the prior art solution shown in FIG. 3, the support devices 14, more precisely the leading edges of the support devices 14, will make contact with the sheet 18 of packaging material, when being tilted in order to arrive in the conveying section 22.

The contact between the leading edges of the support devices 14 and the sheet 18 of packaging material is due to the radius of the pulley 20d. The support devices 14 are rigid and therefore cannot be bent by the radius of the pulley. Consequently, they are arranged in a tangential manner.

In the prior art solution shown in FIG. 4 the support devices 14 are attached to the conveyor belt 12a in a different manner. This leads to the fact that in the area where the support devices 14 are being tilted in order to arrive in the conveying section 22 neighboring trailing edges and leading edges move at different speeds. At the same time, both edges are in contact with the sheet 18 of packaging material.

In the cases shown in FIGS. 3 and 4 the sheet 18 of packaging material risks to be damaged.

As can be seen from FIG. 7, a transition section 28 is provided, wherein the conveyor belt 12a is arranged in a retracted position with respect to the plane 26a defined by the middle section 26.

Therefore, in the area where the support devices 14 are tilted into the conveying section 22 and leave contact with the pulley 20d at the same time, a gap between the sheet 18 of packaging material and the support devices 14, especially their leading edge is provided.

As a consequence thereof, damage of the sheet 18 of packaging material can effectively be prevented.

FIGS. 8 and 9 show a detailed view of two embodiments of support devices 14.

As already has been explained, one or more support devices 14 are mounted on the conveyor belts 12a, 12b in order to transport single sheets or stacks of packaging material.

All support devices 14 of the conveyor assembly 10 can be generally identical, e. g. of the type shown in FIG. 8 or FIG. 9.

Alternatively, different groups of support devices 14 can be mounted on the conveyor belts 12a, 12b, wherein the support devices 14 belonging to the same group are generally identical and the support devices of different groups are generally different.

For example, five support devices 14 according to FIG. 8 can form a first group and five support devices according to FIG. 9 can form a second group. First groups and second groups can be mounted in an alternating manner on the conveyor belts 12a, 12b.

Generally speaking, each support device 14 comprises a multitude of slats 32 being arranged on a basic component 34.

On this basic component 34 the slats 32 are arranged in an upright position and spaced from each other such that respective side contour contact sections 36 of the slats 32 form the substantially flat support surface 16 configured to support the single sheets 18 or stacks of packaging material (see also FIGS. 10 and 11).

As can be seen from FIGS. 8 and 9 all slats 32 are arranged in a substantially parallel manner on the basic component 34. In this context parallel means that a distance between two neighboring slats 32 is constant.

At the same time the slats 32 extend obliquely with respect to a direction 34*a* of general extension of the basic component 34.

In FIGS. 8 and 9 auxiliary lines 38 are oriented perpendicular to the direction 34*a* of general extension of the basic component 34.

Consequently, the slats 32 extend neither perpendicular nor parallel to the direction 34*a*.

As has already been explained, the conveying direction 15 is generally perpendicular to the direction 34*a*. Therefore, the slats are also oriented obliquely with respect to the conveying direction 15.

In the embodiment of FIG. 9 the slats are substantially straight.

The angle of rotation of the slats 32 with respect to the direction 34*a* is exaggerated. In reality this angle is about 0.5° to 15°. In an especially preferred embodiment it is 0.5° to 5°.

For the embodiment of FIG. 8 the same angle of rotation applies, but the representation is not exaggerated in this case.

The slats 32 of this embodiment are crescent-shaped, the radius of curvature being substantially equal for all slats 32.

In a further alternative the slats 32 are crescent-shaped but not oriented obliquely with respect to the conveying direction 15.

As can best be seen from FIG. 10 the basic component 34 is a U-shaped profile, wherein the slats 32 generally extend from a first leg 40 to a second leg 42 of the U-shaped profile being opposed to the first leg 40.

In order to achieve the oblique positions of the slats 32, a connection area 44 on the first leg 40 is offset from a connection area 46 on the second leg 42, when measured with respect to the direction 34*a* of general extension of the basic component 34.

Furthermore, the slats 32 are preloaded with respect to the basic component 34. In this context a compressive preload force is applied to the slats 32 by the legs 40, 42 of the basic component 34.

The slats 32 are preferably made from a steel material, especially from a stainless steel material.

The tips 50 of the teeth 48 form the substantially flat support surface 16.

In the following the assembly of the slats 32 to the respective basic component 34 will be explained in detail.

A first embodiment thereof is shown in FIG. 10.

Each slat 32 is mounted to the basic component 34 by two connection tongues 52, which are arranged on opposite ends of the slat 32. In the assembled state, the connection tongues 52 engage corresponding connection slots 54, whereas only some of the slots 54 are equipped with a reference sign.

As already explained above, the basic component 34 is a U-shaped profile and the connection slots 54 are provided on the legs 40, 42 of the U-shaped profile.

Consequently, the slats 32 generally extend from the first leg 40 to the second leg 42 of the U-shaped profile.

In the embodiment according to FIG. 10 the slots 54 are openings, which means that they are closed on all lateral sides.

During assembly the slats 32 are slightly bent and introduced in the middle section of the U-shaped profile. When the tongues 52 are in the proximity of a corresponding slot 54, a bending force is released and the slats 32 return elastically to their straight original form. At the same time the tongues 52 move into the corresponding slots 54.

In order to vertically position the slats 32 with respect to the basic component 34 each connection tongue 52 is associated with a vertical positioning surface 56, which is arranged on the corresponding slat 32.

In the example shown the vertical positioning surface 56 abuts against an end of the corresponding leg 40, 42 of the basic component 34.

Alternatively, a lower surface 58 of the slats 32 can act as a vertical positioning surface, which then abuts against a ground surface of the basic component 34 in an assembled state.

In a further alternative, vertical positioning surfaces 60 can be provided on the tongues 52. Such vertical positioning surfaces 60 are adapted to cooperate with a ground surface of a corresponding connection slots 54.

The slats 32 also need to be positioned in a horizontal direction.

To this end each connection tongue 52 is associated with a horizontal positioning surface 62, which is arranged on the corresponding slat 32.

In the example shown in FIG. 10 the horizontal positioning surface 62 comprises a first section 62*a* which is arranged above the corresponding connection tongue 52 and a second section 62*b* which is arranged under the corresponding connection tongue 52.

As can best be seen from FIG. 10, two types of slots 54 are provided on the basic component 34 wherein the first type of slot is arranged closer to a basic surface of the basic component 34 than a second type of slot.

The two types of slots 54 are arranged in an alternating manner, when seen in the direction 34*a*.

The different types of slots 54 are adapted to cooperate with different types of connection tongues 52.

In the example shown in FIG. 10 the connection tongue 52 shown on the right side of the slat 32 is arranged closer to the lower surface 58 than the connection tongue 52 shown on the left side of the slat 32. Consequently, two different types of connection tongues 52 are arranged on one slat 32. In other words, the slat 32 is asymmetrical.

Consequently, the slat 32 always cooperates with two slots 54 of different types.

As the types of slots 54 are arranged in an alternating manner, the slats 32 are mounted in alternating orientations. Thereby, a first orientation is for example the orientation shown in FIG. 10.

To change the orientation of the slat 32 it is turned by 180° with respect to a vertical axis.

Thereby, the teeth 48 provided on neighboring slats 32 can be arranged in an offset manner (only represented for the embodiment of FIG. 11).

Alternatively, two different types of slats 32 can be used (not shown). Then, a first type of slats 32 is engageable with a first type of slots 54, but not with the second type of slots 54 and a second type of slats 32 is only engageable with a second type of slots 54, but not with the first type of slots 54.

The first type of slats 32 and the second type of slats 32 can for example differ in the relative position of the teeth 48 on the slats.

Also by this means the teeth 48 provided on neighboring slats 32 can be arranged in an offset manner (only represented for the embodiment of FIG. 11).

FIG. 11 shows a different embodiment, in which the connection slots 54 are open towards an end of the respective leg 40, 42.

In order to mount the slats 32 in the connection slots 54, they are moved in a vertical direction.

Additionally, the slats 32 can be fixed to the basic component 34 by gluing. In the example shown, a gluing connection 64 is provided on both the first leg 40 and the second leg 42 of the basic component 34.

As already explained in connection with the embodiment of FIG. 10 also the embodiment of FIG. 11 comprises two types of slots 54 being able to cooperate with two different types of connection tongues 52 respectively. As in the embodiment of FIG. 10 each of the slats 32 comprises one connection tongue 52 of the first type and one of the second type.

The two slats 32 represented in FIG. 11 are mounted on the basic component 34 in opposed orientations (see especially half tooth).

The horizontal positioning surfaces 62 and vertical positioning surfaces 56 of the embodiment according to FIG. 11 correspond to the surfaces explained in relation to the embodiment of FIG. 10.

As can be seen from the above, each support device 14 comprises a multitude of teeth 48. More precisely, on each slat 32 a plurality or group of teeth 48 is formed, wherein the tips 50 of the teeth 48 form the substantially flat support surface 16 configured to support the single sheets or stacks of packaging material.

In FIG. 13 a first embodiment of the tooth 48 is shown in detail.

All teeth 48 have a substantially triangular shape and extent substantially orthogonal to the support surface 16, wherein the extension of a tooth 48 is defined from a tooth base to the tooth tip 50.

The teeth 48 are substantially 0.5 mm to 10 mm wide, 0.2 mm to 1.0 mm thick and 1 mm to 15 mm high. Preferably, the teeth are 2 mm to 8 mm wide and 3 mm to 15 mm high.

The thickness of the teeth 48 corresponds to the thickness of the slat 32 on which the teeth 48 are formed e.g. by cutting, embossing or stamping.

The tooth tip 50 is rounded by a radius 66 of approximately 0.15 mm.

Neighboring teeth 48 are separated by a gap 68. In the examples shown, on a side of the gap 68, which opposes the tooth tip 50, a recess 70 is arranged.

This recess 70 is at least partly rounded, wherein the rounded portion has a radius of about 0.3 mm.

Furthermore, the recess 70 forms an undercut with respect to the neighboring teeth 48.

Also a transition zone 72 between the recess and the rest of the tooth 48 can be rounded, e.g. by a radius of about 0.15 mm.

The tooth 48 shown in FIG. 13 comprises a base section 74 and a tip section 76. In the tip section 76 an angle α between corresponding tooth flanks is smaller than an angle β between corresponding tooth flanks in the base section 74.

In the example shown, the angle α is approximately 10° and the angle β is approximately 40°.

In terms of proportions the height of the base section 74 is about 2 to 5 times the height of the tip sections 76.

The flanks of the teeth 48 are generally planar.

In the embodiment of FIG. 13, the flank sections comprised in the base section 74 and the flank sections comprised in the tip section 76 are substantially planar.

The transition from the base section 74 to the tip section 76 comprises a radius 78, which is approximately 0.6 mm in the example shown.

FIG. 14 shows a tooth 48 according to a second embodiment. The structure of this tooth 48 is simplified with respect to the embodiment of FIG. 13 in that it does not show a distinct base section and tip section.

Preferably, the teeth 48 on one slat 32 are shaped identically.

Furthermore, it is preferred that the teeth 48 on one support device 14 are all shaped identically.

The invention claimed is:

1. A conveyor belt assembly for transporting single sheets or stacks of a packaging material, the conveyor belt assembly comprising:
    at least one conveyor belt being arranged over at least two pulleys, wherein at least one of the at least two pulleys is adapted to drive the at least one conveyor belt in a conveying direction;
    a conveying section adapted for transporting the single sheets or stacks; and
    a return section adapted to return the at least one conveyor belt from an end of the conveying section to a beginning of the conveying section,
    wherein the conveying section comprises:
        a middle section, in which the at least one conveyor belt is arranged in a substantially flat manner to define a plane, and
        at least one transition section having a curved shape along an entirety of the at least one transition section and inclined with respect to the plane, and arranged from the middle section to a respective pulley of the at least two pulleys, with the at least one conveyor belt being arranged in the at least one transition section in a retracted position with respect to the plane defined by the middle section,
    wherein an entirety of the at least one transition section is off of the at least two pulleys,
    wherein the conveying section comprises at least one guide rail being adapted to define a form of the conveying section,
    wherein one or more support devices are mounted on the at least one conveyor belt, wherein each of the one or more support devices provides a support surface configured to support the single sheets or stacks of packaging material, and
    wherein the one or more support devices are in sliding connection with the at least one guide rail, when located in the conveying section.

2. The conveyor belt assembly of claim 1, wherein the at least one transition section is arranged at a beginning of the conveying section or at an end of the conveying section when seen in the conveying direction or wherein the at least one transition section comprises two transition sections, wherein a first transition section of the two transition sections is arranged at the beginning of the conveying section and a second transition section of the two transition sections is arranged at the end of the conveying section.

3. The conveyor belt assembly of claim 1, wherein the at least two pulleys includes four pulleys, wherein respective axes of rotation of the four pulleys are substantially parallel and the four pulleys are arranged in a substantially trapezoidal manner, when seen in the direction of the axes of rotation.

4. The conveyor belt assembly of claim 1, wherein the at least one guide rail includes two or more guide rails, each guide rail of the two or more guide rails being in sliding connection with the one or more support devices.

5. The conveyor belt assembly of claim 1, wherein the at least one conveyor belt comprises two conveyor belts arranged in a substantially parallel manner.

6. The conveyor belt assembly of claim 1,
    wherein the at least one conveyor belt comprises a first conveyor belt and a second conveyor belt arranged in a substantially parallel manner, and wherein a first end of each of the one or more support devices is attached to the first conveyor belt and a second end of each of the one or more support devices is attached to the second conveyor belt.

7. The conveyor belt assembly of claim 1, wherein the one or more support devices extend substantially perpendicular to the conveying direction.

8. The conveyor belt assembly of claim 1, wherein the one or more support devices are substantially rigid.

9. The conveyor belt assembly of claim 1, wherein the at least one transition section has a length which is more than a radius of the at least two pulleys.

10. The conveyor belt assembly of claim 1, wherein the at least one transition section is 50 mm to 600 mm long, when measured in the conveying direction.

11. A conveyor belt assembly for transporting a packaging material, the conveyor belt assembly comprising:
    at least one conveyor belt arranged to rotate around a first pulley and a second pulley, wherein the first pulley and the second pulley are uppermost pulleys around which the at least one conveyor belt rotates;
    a conveying section adapted for transporting the packaging material; and
    a return section adapted to return the at least one conveyor belt from an end of the conveying section to a beginning of the conveying section,
    wherein the conveying section comprises:
        a middle section, in which the at least one conveyor belt is arranged in a substantially flat manner to define a plane,
        a first transition section inclined with respect to the plane, and arranged from the middle section to the first pulley, with the at least one conveyor belt being arranged in the first transition section in a retracted position with respect to the plane defined by the middle section, and
        a second transition section inclined with respect to the plane, and arranged from the middle section to the second pulley, with the at least one conveyor belt being arranged in the second transition section in a retracted position with respect to the plane defined by the middle section,
    wherein an entirety of the first transition section is off of the first pulley, and an entirety of the second transition section is off of the second pulley, and
    wherein one or more of the first transition section or the second transition section has a length which is more than a radius of the first pulley or the second pulley, respectively.

12. The conveyor belt assembly of claim 11, wherein the conveying section comprises a guide rail provided to define a form of the conveying section.

13. The conveyor belt assembly of claim 11, wherein the at least one conveyor belt comprises two conveyor belts arranged in a substantially parallel manner.

14. A conveyor belt assembly comprising:
    a first pulley;
    a second pulley;
    a third pulley;
    a fourth pulley;
    at least one guide rail provided between the first pulley and the second pulley, the at least one guide rail including:
        a middle section arranged in a substantially flat manner to define a plane,
        a first transition section provided between the first pulley and the middle section, and
        a second transition section provided between the second pulley and the middle section; and
    at least one conveyor belt provided to travel around the first pulley, over the at least one guide rail, around the second pulley, and back to the first pulley,
    wherein an uppermost portion of the first pulley supporting the at least one conveyor belt and an uppermost portion of the second pulley supporting the at least one conveyor belt are arranged below the plane so that the at least one conveyor belt inclines to the plane in the first transition section from the first pulley to the middle section and declines from the plane in the second transition section from the middle section to the second pulley,
    wherein respective axes of rotation of the first, second, third, and fourth pulleys are substantially parallel, and the first, second, third, and fourth pulleys are arranged in a substantially trapezoidal manner, when seen in the direction of the axes of rotation.

15. The conveyor belt assembly of claim 14, wherein at least one of the first transition section or the second transition section is curved.

16. The conveyor belt assembly of claim 14, wherein the second pulley is a next adjacent pulley to the first pulley in a direction of travel of the at least one conveyor belt.

17. The conveyor belt assembly of claim 14, wherein the first pulley and the second pulley are uppermost pulleys around which the at least one conveyor belt rotates.

* * * * *